Dec. 20, 1949 H. SVENSSON 2,492,071
VARIABLE SPEED CHANGING DEVICE
Filed Sept. 6, 1944 3 Sheets-Sheet 1
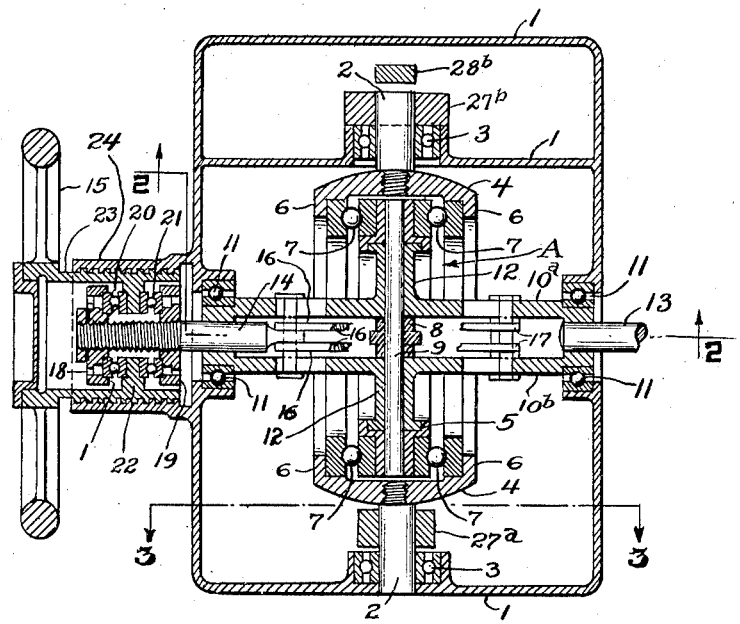
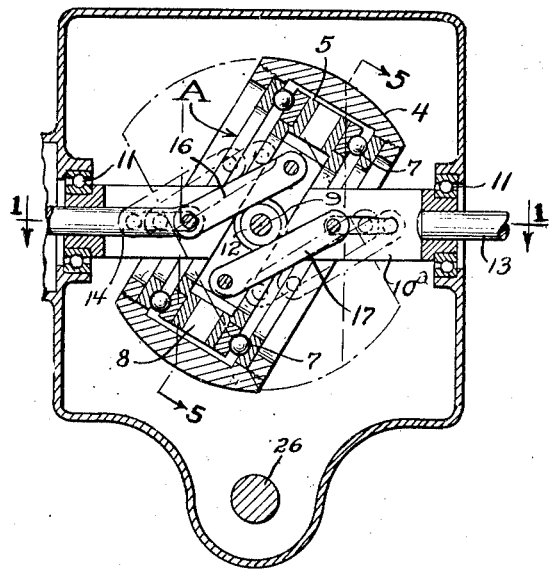
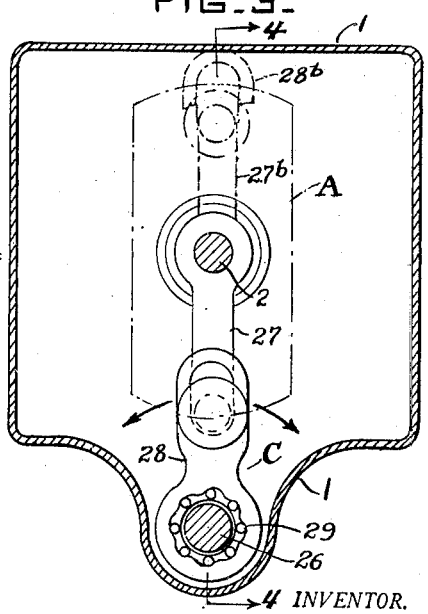
INVENTOR.
HENRY SVENSSON
Deceased.
Agnes B. Svensson
Administratrix.
Elbert R Bronner
ATTORNEY.

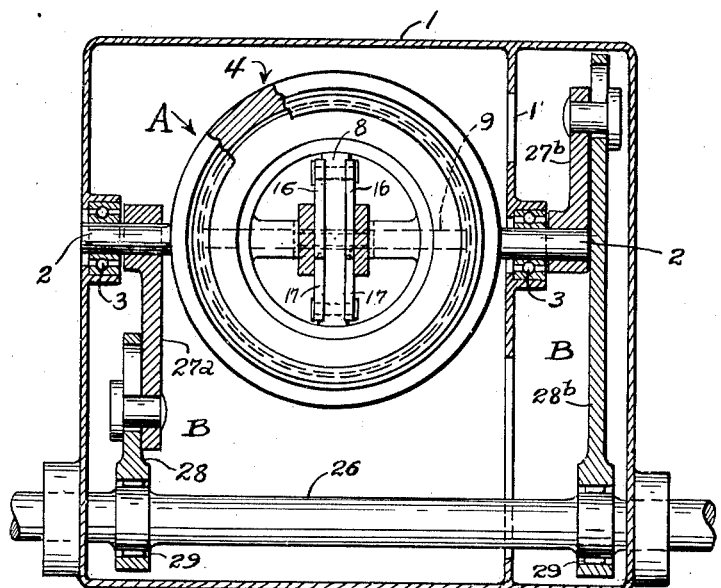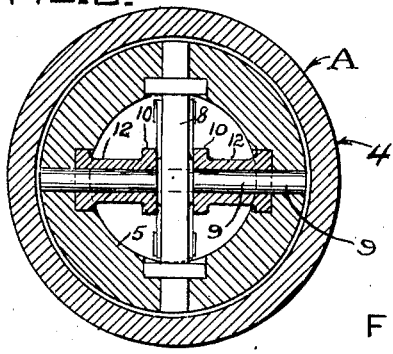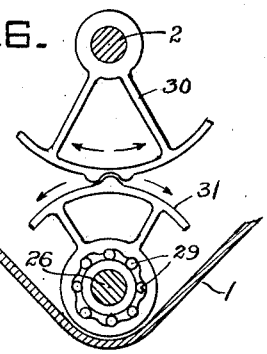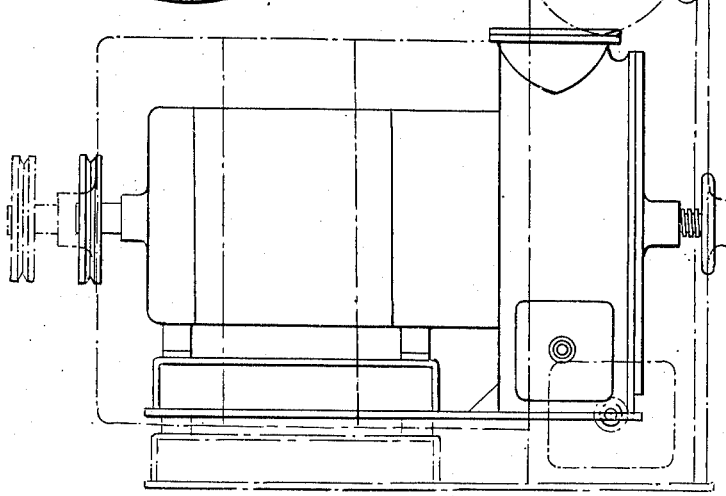

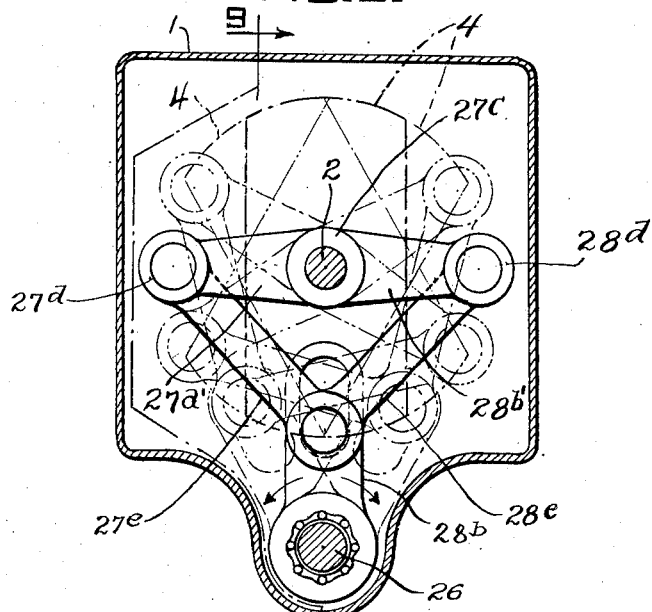
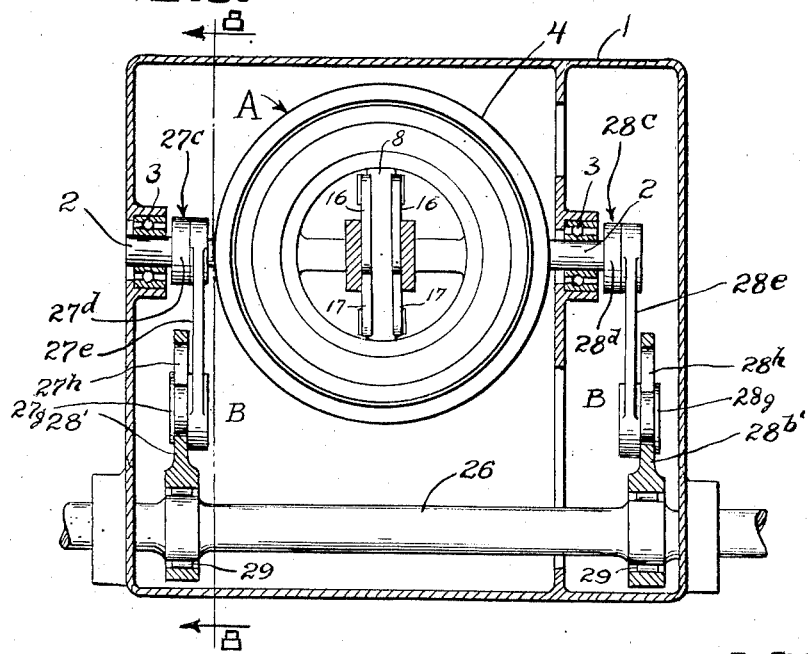

Patented Dec. 20, 1949

2,492,071

UNITED STATES PATENT OFFICE 2,492,071

VARIABLE-SPEED CHANGING DEVICE

Henry Svensson, deceased, late of New York, N. Y., by Agnes B. Svensson, administratrix, New York, N. Y., assignor, by mesne assignments, to Agnes B. Svensson, New York, N. Y.

Application September 6, 1944, Serial No. 552,880

5 Claims. (Cl. 74—63)

This invention relates to a device for the conversion of a constant rotary motion into any desired motion between zero and a given maximum, particularly adapted as a variable speed device, and may also be known as a universal speed changer.

The salient feature in this invention consists of an original speed changing reeling disc, the relative slope of which with respect to the main shaft is adjustable by means of a special device through which the speed of rotation of the driven shaft can be varied as desired.

Another feature of this invention is the adaptability of the device for power driven toy and miniature devices in cooperation with a small motor or self propelling power driving means.

Another feature of this invention is the precise adjustment of the variable speed changing mechanism, being automatic in its movement of oscillating motion for the driving means of the over running clutches on the shaft to be driven, the equalizing crank and lever driving mechanism making the speed constant for the driven shaft.

Other features of this invention will appear as the description proceeds in the following specification, accompanied by the annexed drawings, in which Figure 1 shows a horizontal section through the speed changer with the reeling disc in a neutral position, taken on line 1—1 of Fig. 2.

Figure 2 shows a vertical section through the same speed changer with the reeling disc in the oblique position, taken on line 2—2 of Fig. 1.

Figure 3 is a vertical section taken along the line 3—3 of Figure 1, showing an example of the motion transmission from the reeling disc to the driven shaft.

Figure 4 is a sectional view taken on line 4—4 of Figure 3.

Figure 5 is a sectional view taken along line 5—5 of Figure 2.

Figure 6 is a fragmentary diagrammatic view showing another example of the transmission of the motion.

Figure 7 is a side elevational view of the speed changing device of the present invention.

Figure 8 is a sectional view taken on line 8—8 of Figure 9, and shows an equalizing arrangement of the crank and lever mechanism between the reeling disc and the shaft 26.

Figure 9 is a sectional view on line 9—9 of Figure 8.

This invention consists of three essential members, namely the reeling disc A which comprises several parts, the setting device B and the motion transmitter C.

Within a casing 1 there is disposed an annular reeling disc A which has its pivot journals 2 rotatably mounted in ball bearings 3. The reeling disc A consists of two main parts, the outer annular part or ring 4 which can only execute a pendulating motion around its pivots 2 to which it is secured, and the inner disc 5 with its ball bearings 7 and shafts which rotates in the part 4 and which is held in its position by flanges 6 of the ring 4 or in any other known way. On account of friction, the rotating disc 5 is made to rotate on the ball bearings 7 and is supported by two crosswise positioned shafts 8 and 9, shaft 8 being located within the double armed shaft 10 which is rotatably positioned in two ball bearings 11 within the casing 1, while the shaft 9 passes through a bore-hole in the shaft 8 and through sleeves 12 secured on each arm of the shaft 10.

A driving shaft 13 from the motor (not shown) is secured to one end of the double armed shaft 10, while an adjusting shaft 14 telescopes and is slidably attached to the shaft 10, so that the shaft 14 is forced to rotate with the shaft 10, but can at the same time be screwed forward or backward axially within the double armed shaft 10 by means of the hand wheel 15.

One or more levers 16 are in articulated connection with the end of the adjusting shaft 14 that is within the shaft 10, and the other ends of these levers are in articulated connection with the shaft 8, as a result of which the reeling disc A may be set more or less obliquely according to how far the adjusting shaft 14 is screwed forward within the double armed shaft 10.

The setting device B also consists of several parts and it may be constructed as follows, for example:

On the adjusting shaft 14 there are firmly screwed two flanges 18 and 19 which contain bearings 20 and 21. Between the bearings 20 and 21 is located an annular guide flange 22 that is integral with the the cylinder 23, which is provided with an exterior threaded portion, and which can be screwed out of or into an interiorly threaded cylindrical extension 24 on the casing 1. The handwheel 15 is fixedly secured to the cylinder 23 in the usual known manner. Ball bearings 20 and 21 can be secured in any desired way onto the flanges 18 and 19 that are screwed onto the adjusting shaft 14. By means of this arrangement, both the shaft 14 and the flanges 18 and 19 with their ball bearing halves can rotate on the balls of the bearing within the cylinder 23. This is one description of a setting arrangement, but of course others or other means can be adopted without departing from the scope of this invention, for example, by utilization of a lever.

The object of the motion transmitter C is to transform the to-and-fro motion of the pivots into a rotary motion of a driven shaft 26.

The crank arms are secured on the reeling disc A, designated as 27 and 27b and disposed at 180° from each other (one on each side of the reeling disc A), and these are in connection with connecting rods 28 and 28b mounted on the shaft 26. These connecting rods are provided with over running clutches which drive the shaft 26 when either connecting rod moves forward, and permit either to move back without interfering with the driving action effected by the other. The over running clutches may employ rollers or balls 29. From Figure 6, it can be seen that instead of connecting rods, use may also be made of toothed segments, the transferring principle being the same as above described. Or, other known friction systems may also be used instead of the above described example.

The described arrangement operates in the following way:

When the reeling disc A is in the position shown in Figure 1 and the driving shaft 13 rotates with a constant motion, the shafts 10 and 14 rotate simultaneously by means of the shafts 8 and 9, and the levers 16 and 17, and at the same time the disc 5 is brought into rotation within the ring 4. The ring 4 has its center line at a right angle to the axis of the shaft 13, therefore the output shaft 26 will not rotate at all.

When it is desired to obtain power from the device (by causing the shaft 26 to rotate, the hand wheel 15 is turned to move shaft 14 axially to the right (Figures 1 and 2), causing the reeling disc A to assume a sloping position through the adjusting shaft being screwed into the shaft 10 and by means of the arms 16, as shown on Figure 2, the ring 4 comes to rotate and then the ring 5 rotates within the former with a tilting motion, so as to produce a pendulating motion around the pivots 2, and this prevents the ring 5 from taking part in the rotation of ring 4. In this way the pivots 2 execute a to-and-fro motion which is transferred to the crank arms 27a and 27b or the toothed segment 30, and this in turn transmits the motion to the connecting rods 28 and 28b or the toothed segment 31. When the hinge pivot or clutch lever 27 moves in the direction of the arrow, the connecting rod 28 becomes locked onto the shaft 26 by means of the clutch rollers 29, and sets the shaft 26 in rotation in the direction of the arrow, while the hinge pivot or clutch lever 27b moves opposite to the direction of the arrow, and this causes the connecting rods 28 to free the shaft 26 of the clutch rollers 29. On the return stroke, the rod 28b locks and causes the shaft 26 to rotate in the same way as before, while the rod 28 is in free motion.

According as the position of the reeling disc is more or less oblique, the rotation of the shaft 26 can vary from 0 (as shown in Figure 1) up to a given maximum, while the shaft 13 keeps rotating at the same time with constant speed.

Figures 8 and 9 show an alternative form over Figures 3 and 4, respectively, in which the crank arms 27a' and 28b' are of equal length and form walking beam members 27c and 28c, the ends 27d and 28d are each connected by links or levers 27e and 28e, which connect to pivotal bearings 27g and 28g, slidably arranged in slotted portions 27h and 28h of the hinge pivots or clutch levers 28' and 28b'. The to-and-fro or oscillating movements of the reeling disc 4 and operating lever mechanism are shown in dot-dash lines, in which an equalizing movement is maintained so that the shaft 26 may be driven in a constant clutching intermittent motion, or the transmission motion C.

In Figure 7 a side elevational view is shown of this variable speed changer device, the approximate smallest size being shown in full lines, and the larger size being shown in dot-dash lines, but the device may be still smaller in proportion or larger, if so desired. The main idea is to build such a miniature device adapted for miniature toys or devices using power means for operating, in which variable speed may be accomplished with this present speed changer.

It is to be understood that the drawings and the description thereof, are illustrative of this invention, and reserve any alteration and improvement of any part or in the operation, providing same comes within the spirit of this invention and within the scope of the appended claims.

Having thus described this invention, what is claimed as new and desired to secure by Letters Patent of the United States of America, is as follows:

1. A drive mechanism comprising a housing, a drive shaft journaled in said housing, an inclined camming disc secured to said drive shaft for rotation therewith, a substantially cylindrical follower member surrounding said camming disc and rotatable relative thereto, pivot pins diametrically disposed on said follower member and journaled in said housing for oscillation when said follower member is rocked by rotational movements of said camming disc, a driven shaft journaled in said housing, and means associated with said pivot pins for converting oscillatory movement of said pivot pins to rotation of said driven shaft.

2. A drive mechanism comprising a housing, a drive shaft journaled in said housing, an inclined camming disc, a follower member mounted in said housing, pivot pins secured to said follower member and journaled in said housing to permit pivoting of said follower in response to rotation of said camming disc, said pivot pins being oscillated by such movement of said follower member, a driven shaft journaled in said housing, a crank arm secured to said pivot pins, and an overrunning clutch operatively connected to said driven shaft having an arm member connected at its outer end to the free end of said crank arm for oscillating movement therewith for converting oscillatory movement of said pivot pins to rotation of said driven shaft.

3. A drive mechanism comprising a housing, a drive shaft journaled in said housing, an inclined camming disc, a follower member mounted in said housing, pivot pins secured to said follower member and journaled in said housing to permit pivoting of said follower member in response to rotation of said camming disc, said pivot pins being oscillated by such movement of said follower, a driven shaft journaled in said housing, means associated with said pivot pins for converting oscillatory movement of said pivot pins into rotation of said driven shaft and screw means for changing the inclination of said camming disc from zero inclination to a maximum inclination to cause zero to maximum oscillation of said pivot pins.

4. A drive mechanism comprising a housing, a drive shaft journaled in said housing having spaced apart arms extending across said housing, a camming disc rotatable with said drive shaft and inclinable relative to said drive shaft, means for varying the inclination of said camming disc, a substantially cylindrical follower member surrounding said camming disc, pivot pins diametrically disposed on said follower and pivotally journaled on said housing, said follower being oscillated on said pivot pins in response to rotative movements of said inclined camming disc, a driven shaft journaled in said housing, a crank arm connected to one of said pivot pins, and an overrunning clutch connected to said driven shaft having an arm operatively connected to the free end of said crank arm to cause oscillation of said clutch arm to convert oscillatory movement of said pivot pins to rotary movement of said driven shaft.

5. A drive mechanism comprising a housing, a drive shaft journaled in said housing having spaced apart arms extending across said housing and having bearing portions projecting normal to each arm, a camming disc rotatable with said drive shaft and inclinable relative to said drive shaft, a pivot shaft extending through the bearing portions of said drive shaft and secured at either end in said camming disc permitting relative pivoting of said drive shaft and said disc, a shaft secured diametrically across said camming disc and journaled at the center on said pivot shaft and associated at each end with said camming disc, a screw member associated with said shaft for pivoting said camming disc on said pivot shaft relative to said drive shaft, a follower member surrounding said camming disc, pivot pins diametrically disposed on said follower and pivotally journaled in said housing, said follower being oscillated on said pivot pins in response to rotative movements of said inclined camming disc, a driven shaft journaled in said housing, a crank arm connected to one of said pivot pins, an overrunning clutch operatively connected to said driven shaft having an arm member connected at its outer end to the free end of said crank arm for oscillating movement therewith.

AGNES B. SVENSSON,
*Administratrix of the Estate of Henry Svensson, Deceased.*

REFERENCES CITED

The following references are of record in the file of this patent:

UNITED STATES PATENTS

| Number | Name | Date |
| --- | --- | --- |
| 1,340,447 | Ingoldby | May 18, 1920 |
| 2,073,284 | Muhlenbruch | Mar. 9, 1937 |
| 2,256,079 | Dinzl | Sept. 10, 1941 |